UNITED STATES PATENT OFFICE.

CHRISTOPHER HEFFT, OF PEKIN, ILLINOIS.

IMPROVEMENT IN COMPOUNDS FOR CLARIFYING BEER AND OTHER LIQUIDS.

Specification forming part of Letters Patent No. 129,732, dated July 23, 1872.

*To all whom it may concern:*

Be it known that I, CHRISTOPHER HEFFT, of Pekin, in the county of Tazewell and in the State of Illinois, have invented a Compound, and Process for Making the same, for Clarifying Liquids; and do hereby declare that the following is a full, clear, and exact description thereof.

To prepare this compound I steep one-half pound of isinglass in one gallon of cold water for twelve to twenty-four hours before commencing to compound this liquid; also, dissolve half an ounce of citric acid, half an ounce of tartaric acid, with half an ounce of alum, in one pint of water, cold; also, dissolve, separately, one dram of gum-arabic in enough water for such purpose. Pour the whole of the isinglass and one-half of the solution of acids, alum, and gum into a vessel large enough to agitate the same in, working it to the thickness of cream by means of any apparatus or implement which will continually and rapidly bring the lowest stratum in the vessel to the top and incorporate more or less air therewith in the operation. For the purpose of "stirring," just described, a very convenient form of apparatus is a roller mounted on bearings, with axle and crank or winch, the roller being full of projecting pegs or stirrers. While the liquid is thus being stirred, add two gallons of cold water, which reduces the consistency of the liquid to a proper state. Strain the whole, and pour the undissolved parts back into the agitating-vessel, adding the remainder of the acids, alum, and gum solutions with half of one gallon of cold water, for the purpose of effecting a complete dissolution of the different articles. Work these again, as described before, into the consistency of thick cream, and add one gallon of cold water during the agitation. When done, mix both solutions. This will produce about five gallons of liquid, one gallon of which is sufficient to clarify twenty barrels of beer, ale, wines, or other liquids.

The acids above mentioned may be substituted by any similar effective equivalent.

What I claim as my invention is—

The clarifying ingredients, or their known equivalents, as compounded, and prepared, and to be used substantially as described.

In testimony that I claim the foregoing compound, and the process of making the same, for clarifying liquids, I have hereunto set my hand this 11th day of June, 1872.

CHRISTOPHER HEFFT.

Witnesses:
JAMES M. MORSE,
H. W. WELLS.